US012753658B2

(12) United States Patent
Zhang et al.

(10) Patent No.: US 12,753,658 B2
(45) Date of Patent: Oct. 6, 2026

(54) DEVICES, SYSTEMS, AND METHODS FOR A CUTTING ELEMENT

(71) Applicant: Schlumberger Technology Corporation, Sugar Land, TX (US)

(72) Inventors: Youhe Zhang, Spring, TX (US); Huimin Song, Spring, TX (US); Lijun Song, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 428 days.

(21) Appl. No.: 18/492,383

(22) Filed: Oct. 23, 2023

(65) Prior Publication Data

US 2025/0129673 A1 Apr. 24, 2025

(51) Int. Cl.

| | |
|---|---|
| ***E21B 10/61*** | (2006.01) |
| ***B23K 1/00*** | (2006.01) |
| ***B23K 101/00*** | (2006.01) |
| ***B23P 15/34*** | (2006.01) |
| ***E21B 10/55*** | (2006.01) |
| ***E21B 10/60*** | (2006.01) |

(52) U.S. Cl.

CPC ............ *E21B 10/61* (2013.01); *B23K 1/0008* (2013.01); *E21B 10/55* (2013.01); *E21B 10/602* (2013.01); *B23K 2101/002* (2018.08); *B23P 15/34* (2013.01)

(58) Field of Classification Search

CPC ........ E21B 10/61; E21B 10/55; E21B 10/602; B23K 1/0008; B23K 2101/002

USPC .................................................. 408/199, 408

See application file for complete search history.

(56) References Cited

U.S. PATENT DOCUMENTS

| | | | | |
|---|---|---|---|---|
| 2,098,758 A | | 11/1937 | Reed | |
| 2,976,944 A | | 3/1961 | Ross | |
| 3,070,182 A | | 12/1962 | Runte | |
| 4,106,577 A | | 8/1978 | Summers | |
| 4,303,136 A | | 12/1981 | Ball | |
| 4,452,324 A | | 6/1984 | Jurgens | |
| 4,606,418 A | | 8/1986 | Thompson | |
| 4,723,612 A | * | 2/1988 | Hicks | E21B 10/60 175/429 |

(Continued)

FOREIGN PATENT DOCUMENTS

| | | | | |
|---|---|---|---|---|
| CA | 2188099 C | * | 12/2005 | E21B 10/61 |
| CN | 101942967 A | | 1/2011 | |

(Continued)

OTHER PUBLICATIONS

Radford et al., Durable Bit Coating Reduces Shale Balling in Field Tests and Contributes to Longer Runs, SPE-173113-MS, paper presented at the SPE/IADC Drilling Conference and Exhibition, London, England, UK, Mar. 2015.

(Continued)

*Primary Examiner* — Lawrence Averick
(74) *Attorney, Agent, or Firm* — Jeffrey D. Frantz

(57) ABSTRACT

A cleaning cutting element includes an ultrahard layer joined to a substrate. The substrate includes a substrate bore formed at least partially therethrough. The substrate includes a plurality of conduits that extend from the substrate bore at a junction. The conduits exit the substrate at an exit opening in the circumferential wall to direct drilling fluid to a feature of the bit to which the cleaning cutting element is secured.

20 Claims, 14 Drawing Sheets

(56) References Cited

U.S. PATENT DOCUMENTS

| | | | | |
|---|---|---|---|---|
| 4,739,845 | A | 4/1988 | Dennis | |
| 4,852,671 | A | 8/1989 | Southland | |
| 5,316,095 | A | 5/1994 | Tibbitts | |
| 5,579,855 | A | 12/1996 | Dickey | |
| 6,164,394 | A | 12/2000 | Mensa-Wilmot | |
| 6,581,702 | B2 | 6/2003 | Dickey | |
| 6,986,297 | B2 | 1/2006 | Scott | |
| 7,571,782 | B2 * | 8/2009 | Hall | E21B 10/573 175/425 |
| 8,191,657 | B2 * | 6/2012 | Richert | E21B 10/55 175/428 |
| 9,551,191 | B2 | 1/2017 | Patel | |
| 9,951,567 | B2 | 4/2018 | Cuillier De Maindreville | |
| 10,337,257 | B2 | 7/2019 | Zhang | |
| 10,920,495 | B2 * | 2/2021 | Casad | E21B 10/48 |
| 10,934,783 | B2 * | 3/2021 | Amoudi | E21B 34/10 |
| 10,954,722 | B2 | 3/2021 | Bradford, III | |
| 11,015,394 | B2 * | 5/2021 | Casad | E21B 10/42 |
| 11,988,046 | B1 | 5/2024 | Borissov | |
| 12,385,325 | B2 * | 8/2025 | Clark | E21B 10/42 |
| 2002/0112889 | A1 | 8/2002 | Larsen | |
| 2003/0019333 | A1 | 1/2003 | Scott | |
| 2004/0069540 | A1 | 4/2004 | Kriesels | |
| 2007/0125580 | A1 | 6/2007 | Hall | |
| 2007/0163811 | A1 | 7/2007 | Gutmark | |
| 2008/0314645 | A1 * | 12/2008 | Hall | E21B 10/46 175/428 |
| 2010/0300673 | A1 * | 12/2010 | Richert | E21B 10/54 175/426 |
| 2011/0031029 | A1 | 2/2011 | Gavia | |
| 2011/0266071 | A1 | 11/2011 | Lind | |
| 2015/0136490 | A1 | 5/2015 | Broussard, Jr. | |
| 2015/0267492 | A1 | 9/2015 | Broussard, Jr. | |
| 2015/0368976 | A1 | 12/2015 | Langford | |
| 2016/0177630 | A1 | 6/2016 | Trunk | |
| 2017/0204673 | A1 | 7/2017 | Shi | |
| 2018/0044993 | A1 | 2/2018 | Beavers | |
| 2018/0347283 | A1 | 12/2018 | Wendt | |
| 2019/0128072 | A1 | 5/2019 | Griffo | |
| 2019/0136635 | A1 * | 5/2019 | Casad | E21B 10/42 |
| 2020/0048968 | A1 | 2/2020 | Casad | |
| 2020/0109605 | A1 * | 4/2020 | Amoudi | E21B 10/46 |
| 2021/0180408 | A1 * | 6/2021 | Clark | E21B 10/60 |
| 2022/0143720 | A1 | 5/2022 | Wagner | |
| 2022/0389766 | A1 | 12/2022 | Zahradnik | |
| 2024/0026740 | A1 | 1/2024 | Zhang | |
| 2025/0223873 | A1 | 7/2025 | Trunk | |
| 2025/0223887 | A1 | 7/2025 | Trunk | |

FOREIGN PATENT DOCUMENTS

| | | | |
|---|---|---|---|
| CN | 203603768 | U | 5/2014 |
| CN | 104612594 | B | 3/2017 |
| EP | 0107475 | B1 | 12/1988 |
| EP | 0959224 | A2 | 11/1999 |
| WO | 9624744 | A1 | 8/1996 |

OTHER PUBLICATIONS

Hariharan et al., Bit Balling Reduction by Electro-Osmosis While Drilling Shale Using a Model BHA (Bottom Hole Assembly), SPE-39311-MS, Paper presented at the IADC/SPE Drilling Conference, Dallas, Texas, Mar. 1998.

* cited by examiner

DEVICES, SYSTEMS, AND METHODS FOR A CUTTING ELEMENT

CROSS-REFERENCE TO RELATED APPLICATIONS

N/A.

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be formed in earthen formations using earth-boring tools such as drill bits for drilling wellbores and reamers for enlarging the diameters of wellbores. An earth-boring tool may include one or more cutting elements secured to a blade of the tool. Typically, the tool includes one or more cutter pockets on an outer surface of the tool body, and the cutting elements are secured within the pockets by brazing.

SUMMARY

In some aspects, the techniques described herein relate to a bit. The bit includes a body having a longitudinal axis. A fluid passage extends through the body. A plurality of blades extend from the body. The plurality of blades forming a plurality of junk slots between adjacent blades of the plurality of blades. A cleaning cutting element is located at a center region of the bit. The cleaning cutting element includes a substrate including a substrate bore extending at least partially therethrough. The substrate bore is in fluid communication with the fluid passage of the body. A plurality of conduits are in fluid communication with the substrate bore. Each conduit of the plurality of conduits include an exit opening directing drilling fluid out of the body of the bit. An ultrahard layer with super hard material, such as polycrystalline diamond (PCD), is joined to an upper surface of the substrate. In some embodiments, the entirety of the cutting element has a diamond top and a substrate.

In some aspects, the techniques described herein relate to a cutting element. The cutting element includes an ultrahard layer and a substrate joined to the ultrahard layer. The substrate includes a body and an upper surface of the body. The ultrahard layer is joined to the upper surface of the body. The ultrahard layer includes a bottom surface of the body and a circumferential wall of the body extending between the upper surface and the bottom surface. The body forms a substrate bore having an inlet in the bottom surface of the body. The substrate bore includes a plurality of conduits opening to a plurality of exit openings in the circumferential wall of the body.

In some aspects, the techniques described herein relate to a method for manufacturing a cutting element. The method includes forming an ultrahard layer on a substrate. The method includes forming, in the substrate, a substrate bore. The substrate bore extends from an inlet at a bottom surface of the substrate to a junction proximate the ultrahard layer. The operator forms, in the substrate, a plurality of conduits. The plurality of conduits extend from the junction to a circumferential wall of the substrate.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a perspective view of a bit including a cleaning cutting element, according to at least one embodiment of the present disclosure;

FIG. 2-2 is a top-down view of the bit of FIG. 2-1;

FIG. 2-3 is a lateral cross-sectional view of the bit of FIG. 2-1;

FIG. 2-4 is a longitudinal cross-sectional view of the bit of FIG. 2-1;

FIG. 3-1 is a side view of a cleaning cutting element, according to at least one embodiment of the present disclosure;

FIG. 3-2 is a lateral cross-section view of the cleaning cutting element of FIG. 3-1;

FIG. 4 is a cross-sectional view of a representation of a cleaning cutting element, according to at least one embodiment of the present disclosure;

FIG. 8-1 is an exploded view of a cleaning cutting system, according to at least one embodiment of the present disclosure;

FIG. 8-2 is a cross-sectional view of the assembled cleaning cutting system of FIG. 8-1;

DETAILED DESCRIPTION

This disclosure generally relates to devices, systems, and methods for a cutting element having a fluid path to direct drilling fluid from a substrate bore in the substrate to conduits having exit openings in a sidewall of the substrate. Conventionally, a bit may have limited fluid flow in the center region of the bit. The bit may include cutting elements that extend into the center region of the bit to remove the material. To remove cuttings and/or cool the bit, the bit may typically include one or more nozzles located in the junk slots between two blades. The nozzles may effectively direct fluid between the blades, but drilling fluid may not efficiently circulate around the center region of the bit. Or, due to the angles of the traditional nozzle orientation, the nose and shoulder regions may not have efficient hydraulic energies for cooling and carrying cuttings away quickly. This may reduce the efficiency of cutting removal and/or cooling of the cutting elements in the center, nose, shoulder region.

In accordance with at least one embodiment of the present disclosure, a cutting element may be secured to the center region of a bit. Drilling fluid may pass through the body of the bit and into a substrate bore of the cutting element. The drilling fluid may be directed through one or more conduits out of the cutting element. The conduits may direct the drilling fluid toward one or more structures on the bit. For example, the drilling fluid may be directed toward one or more junk slots between two blades of the bit. This may help improve fluid flow in the center and nose regions of the bit. Improving fluid flow in the center of the bit may help improve the cutting efficiency of the bit and/or reduce a buildup of cuttings and other material in the center and nose regions of the bit.

Figure 1:
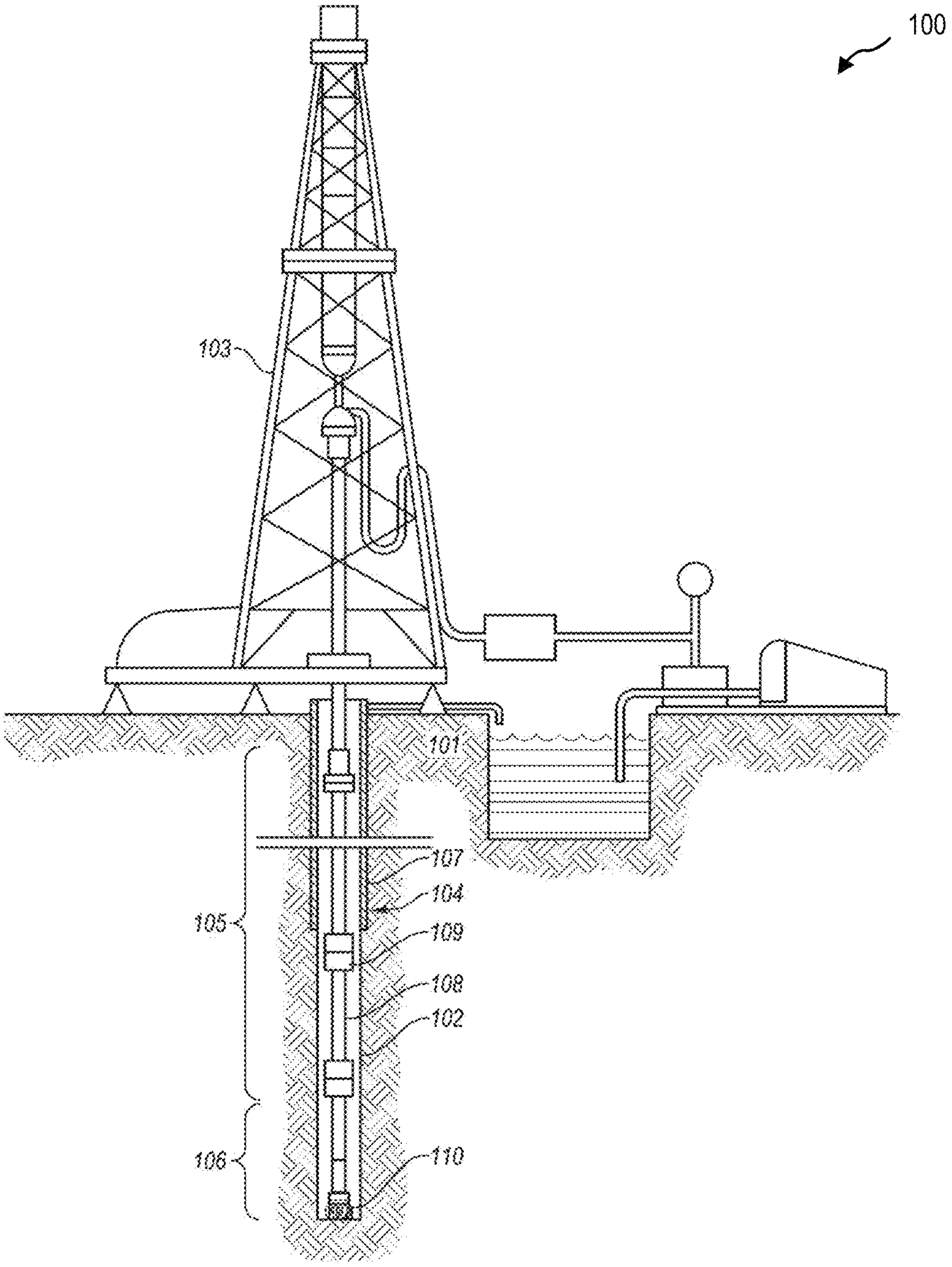
FIG. 1 shows one example of a drilling system for drilling an earth formation to form a wellbore; according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

The bit 110 may include a cleaning cutting element secured to a center region of the bit. The cleaning cutting element may include an ultrahard layer secured to a substrate. The substrate may include a substrate bore that is in fluid communication with a fluid passage through the bit 110. The cleaning cutting element may include a plurality of conduits connected to the substrate bore that terminate at exit openings on a sidewall of the cutting element. The exit openings may be oriented to direct drilling fluid to one or more structures on the bit. For example, the exit openings may direct drilling fluid to the junk slots between the blades. As discussed herein, this may help to improve circulation of the drilling fluid in the center region, thereby improving drilling efficiency and/or reducing or preventing buildup of cuttings and/or other material in the center region.

Figures 1, 2:
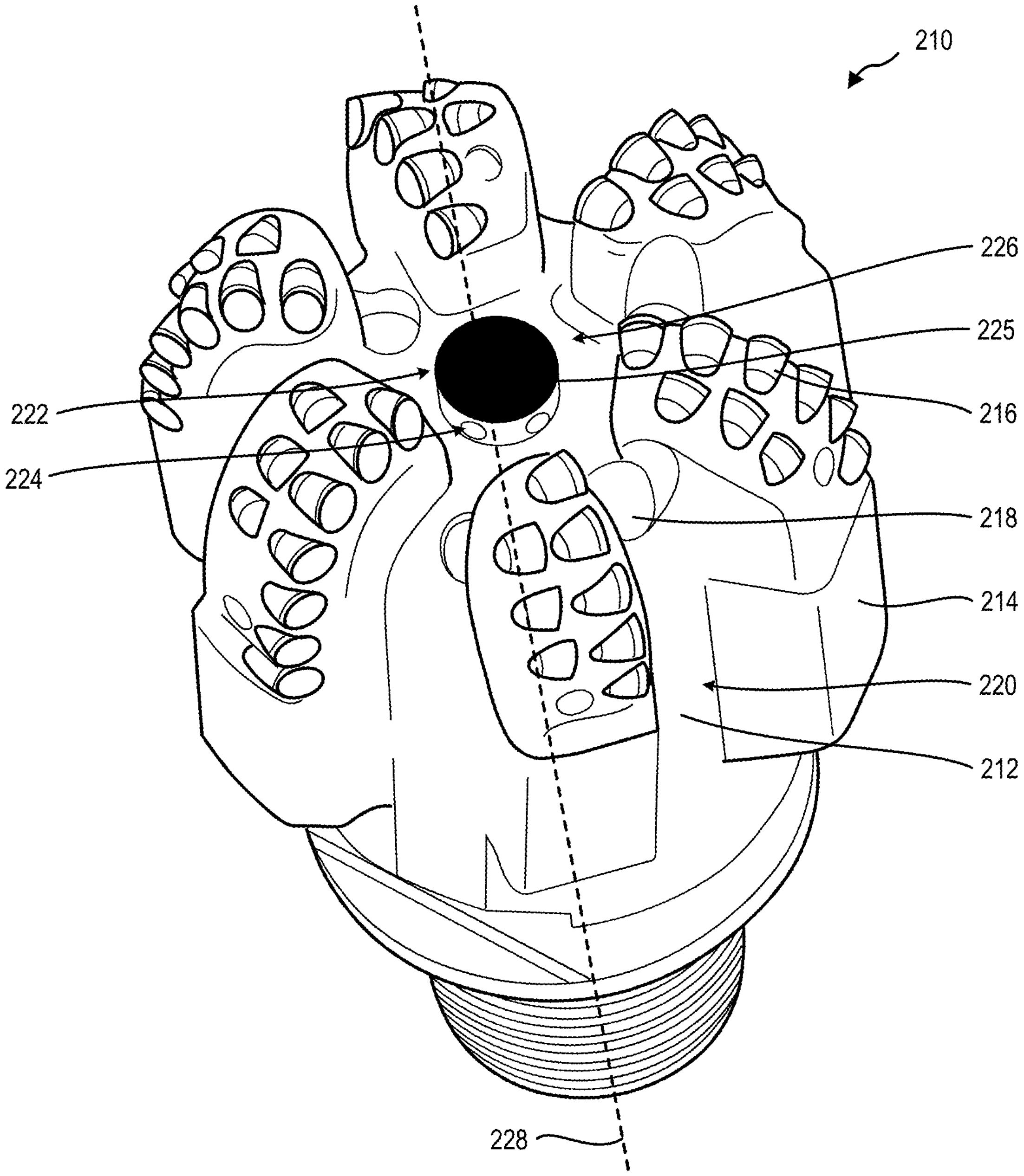
Figure 2:
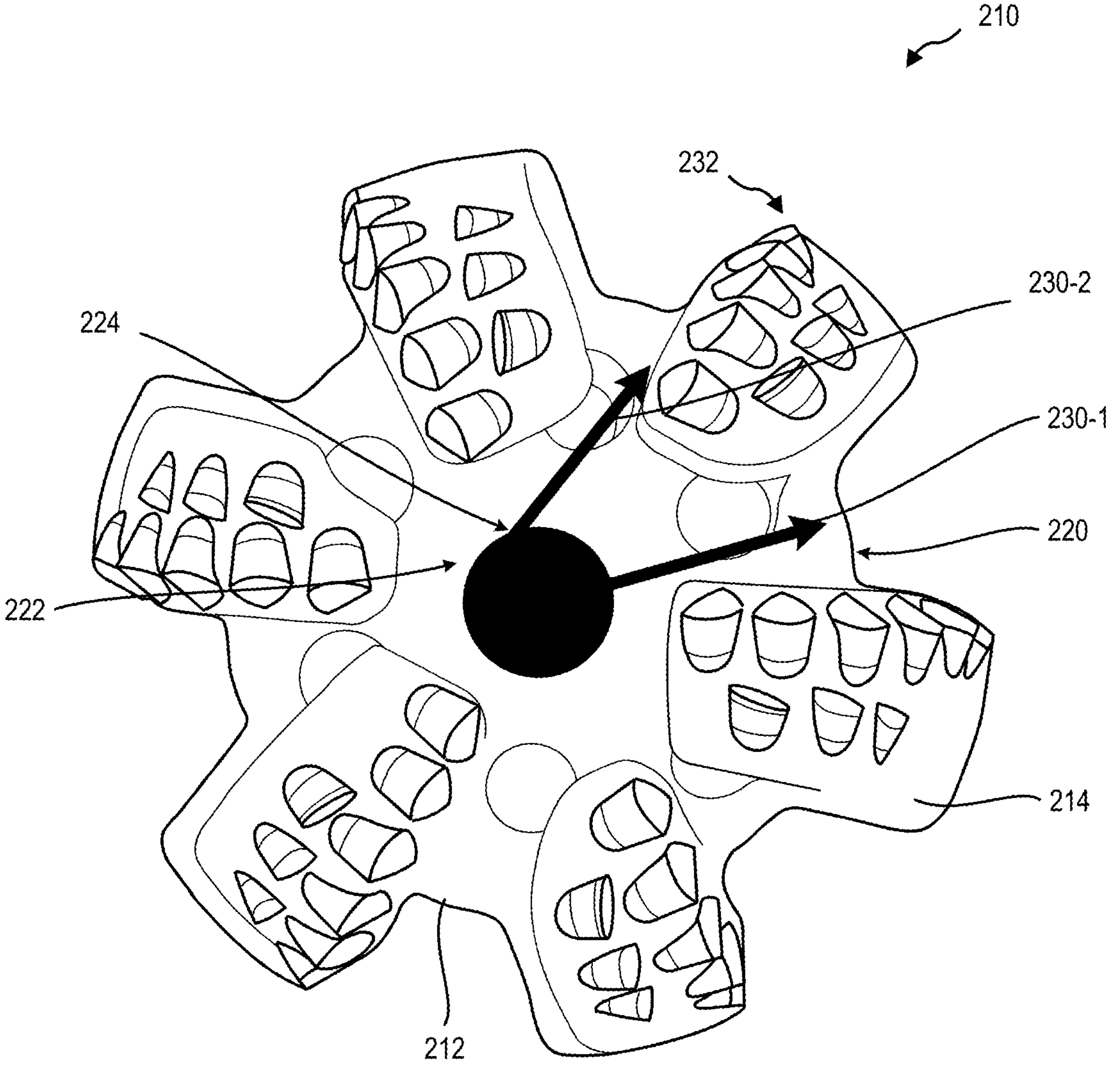

FIG. 2-1 is a representation of a perspective view of a bit 210, according to at least one embodiment of the present disclosure. The bit 210 includes a body 212 and a plurality of blades 214 extending from the body 212. The bit 210 may further include a plurality of cutting elements 216 secured to one or more of the blades 214. As the bit 210 rotates, the cutting elements 216 may engage the formation and degrade at least a portion of the formation.

The bit 210 may further include one or more nozzles 218. Drilling fluid may pass through a fluid passage in the body 212 of the bit 210 and may be directed out of the bit 210 through the nozzles 218. This may help to cool the bit 210, including the cutting elements 216, the blades 214, the body 212, and other portions of the bit 210. In some situations, the drilling fluid directed from the one or more nozzles 218 may pass through junk slots 220 located between two adjacent blades 214. Cuttings, or material removed by the cutting elements 216 during drilling, may be flushed away from the cutting elements 216 through the junk slot 220 in front of the cutting elements 216.

In accordance with at least one embodiment of the present disclosure, the bit 210 may include a cleaning cutting element 222. The cleaning cutting element 222 may include an ultrahard layer 223 joined to a substrate 225. The ultrahard layer 223 may be formed from a superhard material, such as polycrystalline diamond (PCD) and/or a polycrystalline diamond compact (PDC).

In some embodiments, the cleaning cutting element may include both substrate and PCD on a top portion 251 of the cleaning cutting element 222. For example, the top portion 251 may include the conical shape of the ultrahard layer 223. The substrate 225 material may extend into the conical top portion 251 of the cleaning cutting element 222.

The ultrahard layer 223 may be shaped and located to engage the formation. For example, the ultrahard layer 223 may have a conical shape. The conical ultrahard layer 223 may engage the formation to degrade the formation. In some embodiments, the ultrahard layer 223 may be configured to engage the formation vertically along the longitudinal axis 228. As the bit 210 is lowered to the formation along the longitudinal axis 228, the ultrahard layer 223 may contact the formation and crush the formation at the point of the cone. This may help improve degradation of the formation in a center region 226 of the bit 210 where rotation of the bit 210 may limit and/or reduce the shearing motion of cutting elements 216 at the center region 226.

In some embodiments, the ultrahard layer 223 may have any other shape. For example, the ultrahard layer 223 may have a frustoconical shape, a conical shape with an offset tip of the cone, a ridge shape (e.g., an "axe" shape), a conical shape with two or more tips, any other shape, and combinations thereof.

The cleaning cutting element 222 may include a bore through the substrate 225. Drilling fluid that is directed through the body 212 may be directed into the substrate 225 of the cleaning cutting element 222 and out of the substrate 225 through one or more exit openings 224.

The exit openings 224 on the cleaning cutting element 222 may direct the drilling fluid to any structure on the bit 210. For example, the exit openings 224 may direct the drilling fluid to one or more of the blades 214. In some examples, the exit openings 224 may direct the drilling fluid to one or more of the cutting elements 216 on the blades 214. In some examples, the exit openings 224 may direct the drilling fluid to the junk slots 220 between adjacent blades 214.

In some embodiments, the drilling fluid exiting the exit openings 224 may cool the cleaning cutting element 222, the blades 214, the body 212, and/or the cutting elements 216 on the bit 210. In some embodiments, the drilling fluid exiting the exit openings 224 may flush cuttings away from the bit 210. For example, the drilling fluid exiting the exit openings 224 may flush cuttings away from the cutting elements 216 on the blades 214, through and away from the junk slots 220 between adjacent blades 214, and/or away from the body 212 of the bit 210. The drilling fluid exiting the exit openings 224 may help improve cooling and/or cutting removal of the bit 210.

In accordance with at least one embodiment of the present disclosure, the cleaning cutting element 222 may be located in a center region 226 of the bit 210. The center region 226 may be the bottom region of the bit 210. For example, the cleaning cutting element 222 may be located at the bottom of the bit 210. In some examples, the cleaning cutting element 222 may be located between the blades 214 of the bit 210. In some examples, the cleaning cutting element 222 may be located at a longitudinal axis 228 of the bit 210. In some examples, the cleaning cutting element 222 may be co-axial with the longitudinal axis 228. In some examples, the cleaning cutting element 222 may have a conical shape, and a point of the conical shape of the cleaning cutting element 222 may intersect the longitudinal axis 228.

In some embodiments, the bit 210 may include a cleaning cutting element 222 in any portion of the bit 210. For example, the bit 210 may include a cleaning cutting element 222 on a blade 214 of the bit 210, on a body 212 of the bit 210 offset from the longitudinal axis 228 of the bit 210. Placing the cleaning cutting element 222 in any portion of the bit 210 may help to improve the fluid flow throughout the bit 210.

In some embodiments, the cleaning cutting element 222 may include an exit opening 224 for each junk slot 220 in the bit 210. For example, a conduit quantity of the fluid conduits 236 and/or the exit openings 224 may be the same as a blade quantity of the blades 214. In some embodiments, the cleaning cutting element 222 may include fewer exit openings 224 than junk slots 220. For example, the conduit quantity of the fluid conduits 236 and/or the exit openings 224 may be less than the blade quantity of the blades 214. In some examples, the cleaning cutting element 222 may include an exit opening 224 for each primary blade 214. In some examples, the cleaning cutting element 222 may include more exit openings 224 than blades 214 and/or junk slots 220. For example, the conduit quantity of the fluid conduits 236 and/or the exit openings 224 may be the greater than as the blade quantity of the blades 214.

In some embodiments, the exit openings 224 may be directed at specific features of the bit 210. For example, the exit openings 224 may be directed at a center of the junk slots 220. In some examples, the exit openings 224 may be directed at the blades 214. In some examples, the exit openings 224 may be directed at particular cutting elements 216 and/or groups of cutting elements 216. In some examples, the exit openings 224 may be directed at a leading edge of the blades 214. In some examples, the exit openings 224 may be directed at one or more of the nozzles 218 to facilitate and/or improve flow of the drilling fluid from the nozzle 218. In some examples, different exit openings 224 may be directed at different features of the bit 210. For example, a first exit opening 224 may be directed at a junk slot 220 and a second exit opening 224 may be directed at a cutting element 216.

FIG. 2-2 is a representation of a top-down view of the bit 210 illustrated in FIG. 2-1. The exit openings 224 may direct a flow (collectively 230) of drilling fluid to one or more features of the bit 210. For example, an exit opening 224 may direct a first flow 230-1 of the drilling fluid to a junk slot 220 between two blades 214. The first flow 230-1 may be directed to the center of the junk slot 220. This may help to increase fluid flow through the bit 210, which may help to flush cuttings away from the center region 226 of the bit 210, help to flush cuttings away from the blades 214, help flush cuttings out of the junk slots 220, increase cooling on one or more structures of the bit 210, perform any other action, and combinations thereof.

In some embodiments, the flow 230 of the drilling fluid may be oriented perpendicular from the cleaning cutting element 222. The conduits opening at the exit openings 224 may be oriented toward and open perpendicular to the outer cylindrical surface of the substrate. This may cause the flow 230 of the drilling fluid to exit the exit openings 224 perpendicularly or approximately perpendicularly to the cleaning cutting element 222. In the embodiment shown in FIG. 2-2, the cleaning cutting element 222 is rotationally oriented in the body 212 to direct the first flow 230-1 of the drilling fluid perpendicularly away from the cleaning cutting element 222 toward the junk slot 220. In some embodiments, the cleaning cutting element 222 may be rotationally oriented to be oriented at any feature of the bit 210, such as the blade 214 and/or one of the cutting elements 216.

In some embodiments, the flow 230 of the drilling fluid may be oriented transverse or non-perpendicular to the cleaning cutting element 222. For example, the flow 230 of the drilling fluid may be oriented transverse to the outer surface of the substrate. This may allow the flow 230 to be oriented at a specific feature of the bit 210. For example, in the embodiment shown in FIG. 2-2, a second flow 230-2 of the drilling fluid is oriented transverse to the cleaning cutting element 222 to direct the second flow 230-2 to the cutting element 216 shown and/or to direct the second flow 230-2 to more closely follow the leading face 232 of the blade 214. Directing the second flow 230-2 to the cutting element 216 and/or the leading face 232 of the blade 214 may help to improve operation of the bit by flushing cuttings away from the cutting element 216 and/or the leading face 232, provide cooling to the cutting element 216 and/or the leading face 232 of the blade 214, otherwise improve performance of the bit 210, and combinations thereof.

Figures 2, 3:
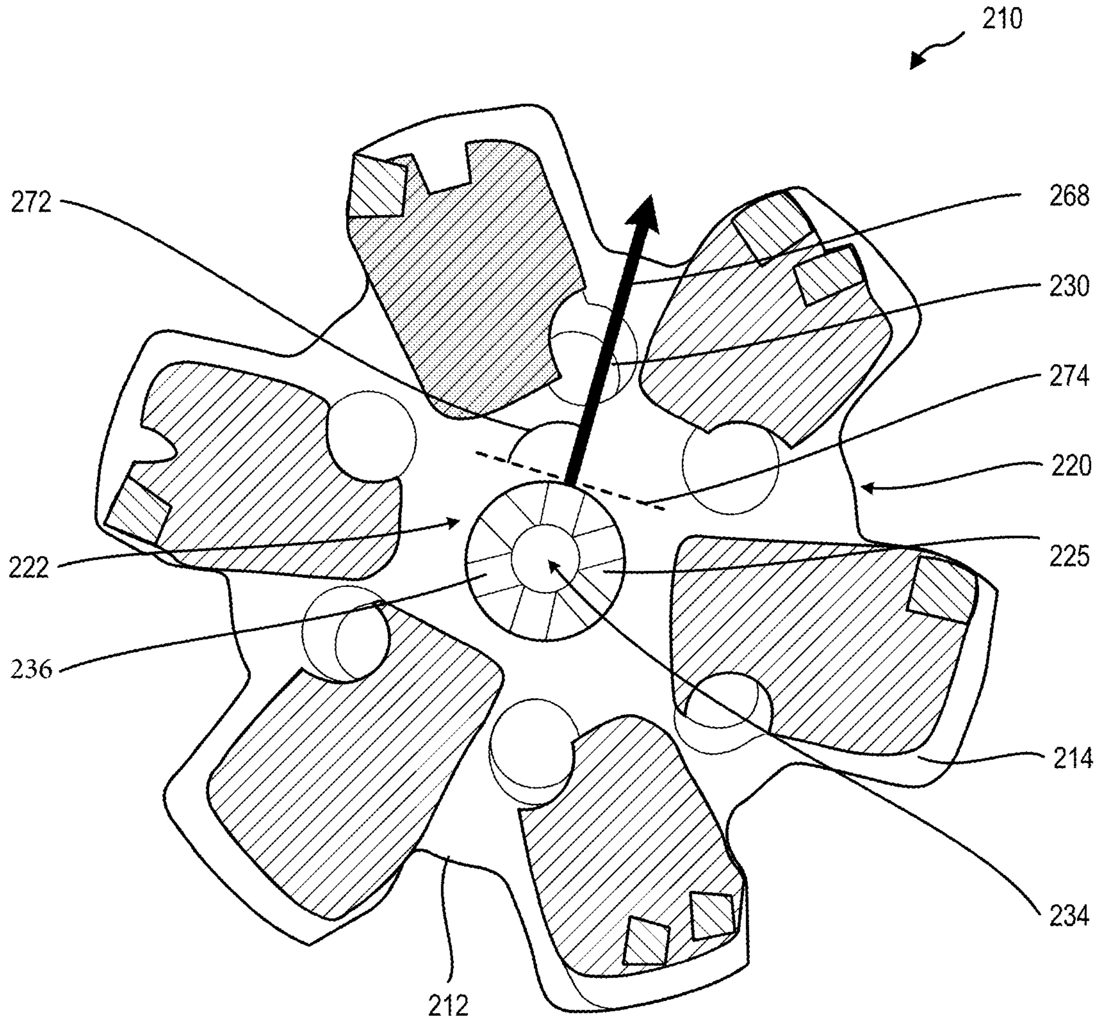

FIG. 2-3 is a lateral cross-sectional view of the bit 210 illustrated in FIG. 2-1. In the cross-sectional view shown, the cleaning cutting element 222 includes six fluid conduits 236 extending from a substrate bore 234 in the substrate 225 of the cleaning cutting element 222. The substrate bore 234 may extend at least partially through the substrate 225. The fluid conduits 236 extend through the substrate 225 to six exit openings 224 in the outer surface of the cleaning cutting element 222. The six fluid conduits 236 and exit openings 224 shown are oriented to direct flows 230 of drilling fluid from the substrate bore 234 to each of the junk slots 220 between the blades 214. As discussed herein, this may help to flush cuttings out of the center region 226 of the bit 210 and/or cool the bit 210.

While the embodiment shown in FIG. 2-3 illustrates six fluid conduits 236 directing six flows 230 from the cleaning cutting element 222, it should be understood that the cleaning cutting element 222 may include any number of fluid conduits 236 directing any number of flows 230 from the cleaning cutting element 222. Further, while the embodiment shown illustrates the flows 230 as extending perpendicular to the cleaning cutting element 222, it should be understood that the flow 230 may extend in any direction from the cleaning cutting element 222 and/or toward any feature of the bit 210.

In some embodiments, the fluid conduit 236 may extend at a radial conduit angle 272 that extends between a conduit axis 268 through the fluid conduit 236 and a tangent line 274 that is tangent to the substrate bore 234 and/or the circumferential wall of the substrate 225. In some embodiments, the radial conduit angle 272 may be in a range having an upper value, a lower value, or upper and lower values including any of 90°, 85°, 80°, 75°, 70°, 65°, 60°, 55°, 50°, 45°, or any value therebetween. For example, the radial conduit angle 272 may be greater than 45°. In another example, the radial conduit angle 272 may be less than 90°. In yet other examples, the radial conduit angle 272 may be any value in a range between 45° and 90°. In some embodiments, it may be critical that the radial conduit angle 272 is between 60° and 90° to direct the drilling fluid to a particular feature of the bit. In some embodiments, each of the fluid conduits 236 may have the same radial conduit angle 272. In some embodiments, different fluid conduits 236 may have different radial conduit angles 272. In some embodiments, adjacent fluid conduits 236 may have the same or different radial conduit angles 272. In some embodiments in which the cleaning cutting element 222 is arranged along the bit axis 228, one or more of the fluid conduits 236 extend in a radial direction from the substrate bore 234 and the bit axis 228 such that the radial conduit angle 272 is 90° (i.e., perpendicular to the bit axis 228).

Figures 2, 3, 4:
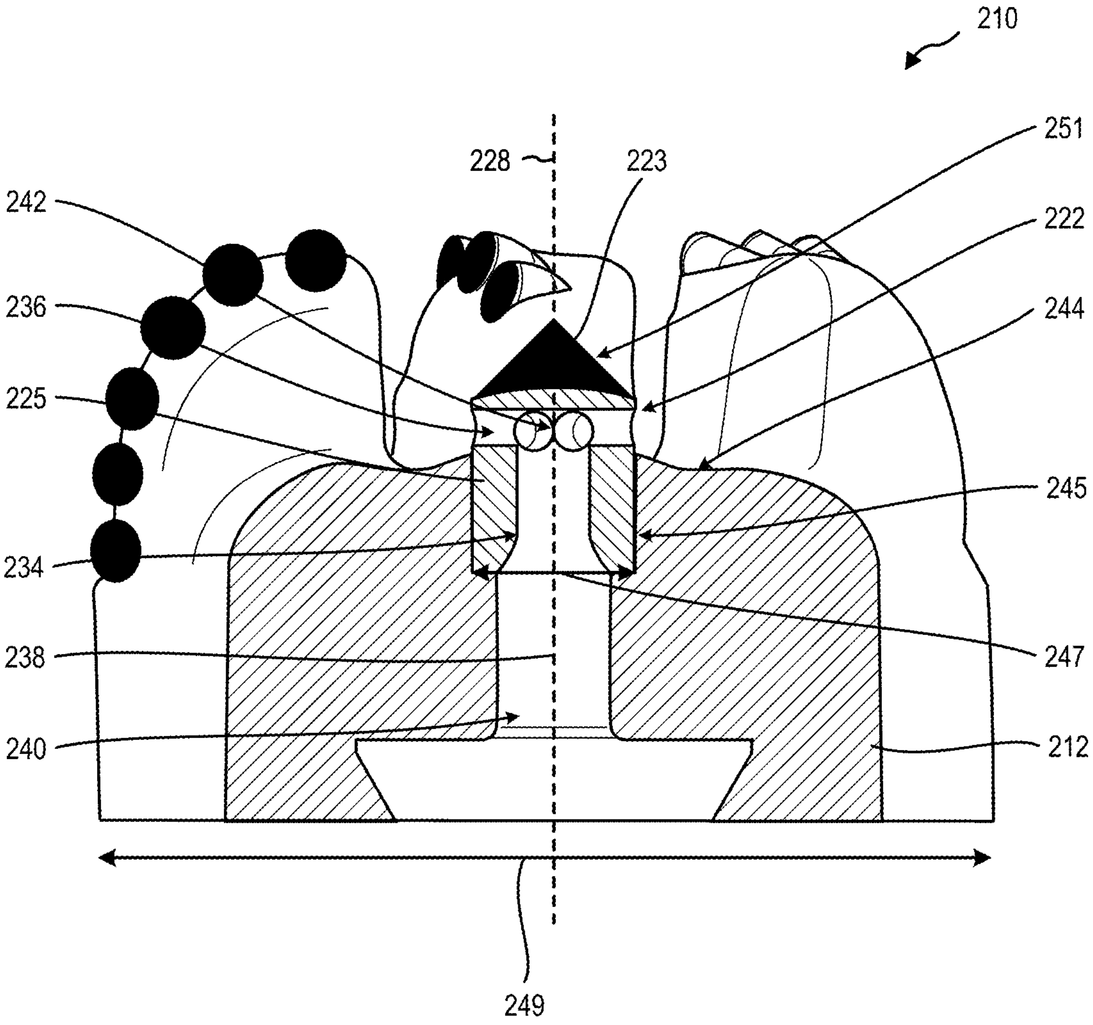
Figures 1, 3:
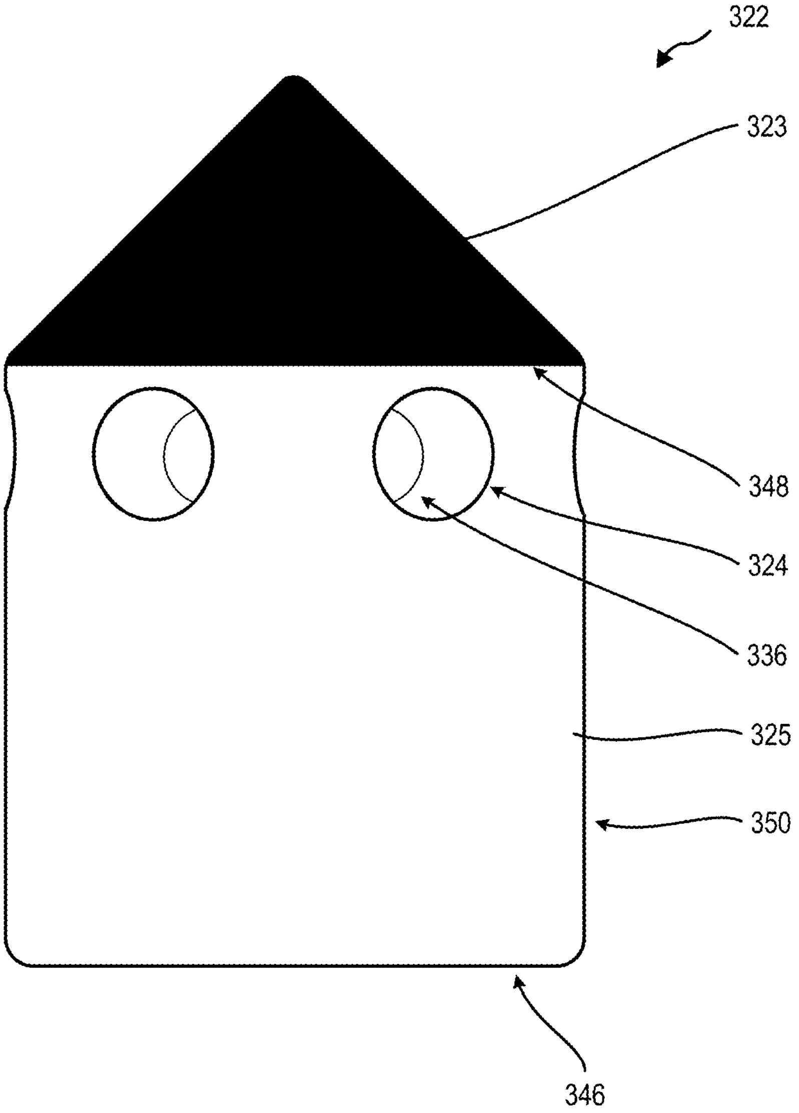
Figures 2, 3:
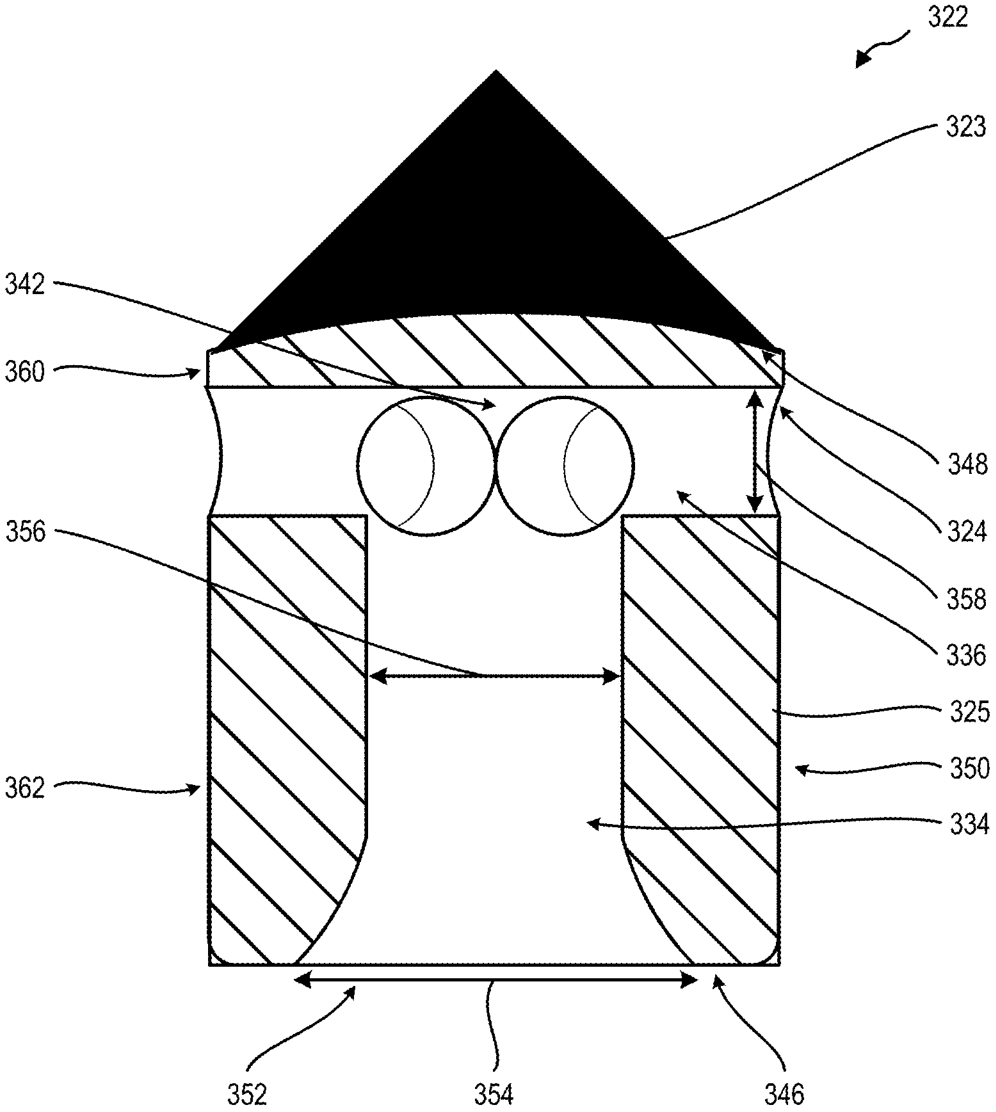
Figure 4:
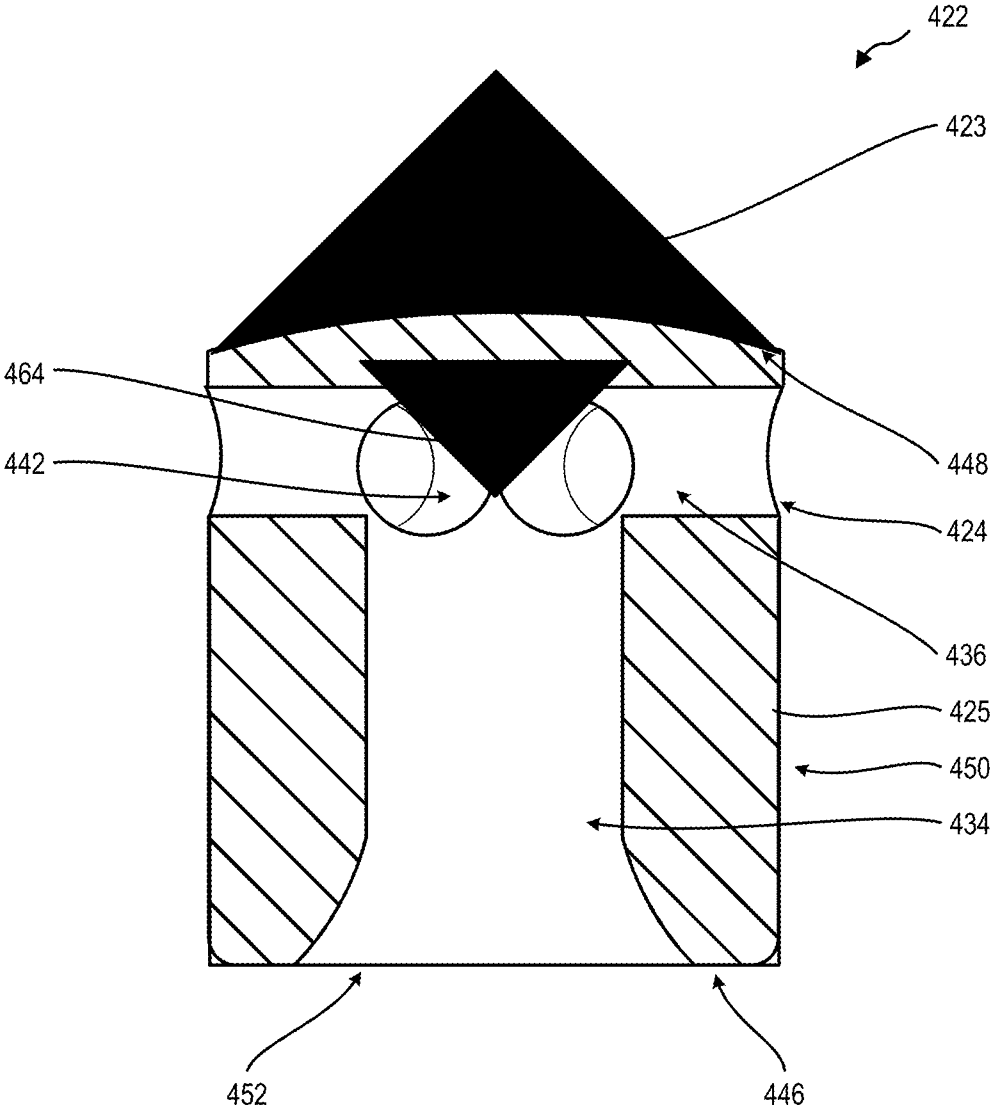

FIG. 2-4 is a longitudinal cross-sectional view of the bit 210 illustrated in FIG. 2-1. As may be seen, a primary flow 238 of the drilling fluid may flow through a fluid passage 240 in the body 212 of the bit 210. The fluid passage 240 may be in fluid communication with the substrate bore 234. For example, the primary flow 238 of the drilling fluid may pass from the fluid passage 240 in the body 212 and into the substrate bore 234 formed in the substrate 225 of the cleaning cutting element 222. The primary flow 238 may be diverted at a junction 242 in the cleaning cutting element 222 to the fluid conduits 236. This may cause the primary flow 238 to be separated into the flows 230 of drilling fluid that are directed out of the fluid conduits 236 and to the various features of the bit 210.

In the embodiment shown, the junction 242 is located at an upper portion of the cleaning cutting element 222. For example, the junction 242 may be located proximate the ultrahard layer 223. In some examples, the junction 242 may be located in the substrate 225 of the cleaning cutting element 222 proximate the ultrahard layer 223. In some embodiments, the junction 242 may be located at any portion along the length of the cleaning cutting element 222. The junction 242 may be located to help direct and/or split the primary flow 238 of drilling fluid into the fluid conduits 236 and the flows 230 that are directed to the various features of the bit 210.

As discussed in further detail herein, the substrate 225 may include a deflector plate at the junction 242 between the substrate bore 234 and the fluid conduits 236. The deflector plate may be located at an upper surface of the junction 242 to contact the drilling fluid when the drilling fluid passes into the junction 242. The deflector plate may help to redirect the drilling fluid and reduce wear and/or erosion of the substrate 225 at the junction 242.

As may be seen, the substrate 225 of the cleaning cutting element 222 may extend above a bit junk slot surface 244 of the body 212. The substrate 225 may extend above the bit junk slot surface 244 of the body 212 to allow the exit openings 224 to direct the flow 230 of the drilling fluid out of the fluid conduits 236 and toward the features of the bit 210. In some embodiments, extending the substrate 225 above the bit junk slot surface 244 may cause the ultrahard layer 223 to extend further above the bit junk slot surface 244, thereby engaging the formation above the bit junk slot surface 244.

The cleaning cutting element 222 may be secured to the body 212 of the bit 210 at the bit junk slot surface 244. For example, the body 212 may include a cutting element pocket 245. The cutting element pocket 245 may extend into the body 212 from the bit junk slot surface 244 of the body 212. The cleaning cutting element 222 may be brazed to the bit 210 in the cutting element pocket 245 to secure the cleaning cutting element 222 to the body 212. In some embodiments, the cleaning cutting element 222 may be secured to the bit 210 at the cutting element pocket 245 in any manner, such as through weld, braze, mechanical fastener, shrink fit, press-fit, interference fit, any other manner, and combinations thereof.

The cleaning cutting element 222 includes a cutting element diameter 247. In some embodiments, the cutting element diameter 247 may be in a range having an upper value, a lower value, or upper and lower values including any of 0.5 in. (1.3 cm), 0.6 in. (1.5 cm), 0.7 in. (1.8 cm), 0.8 in. (2.0 cm), 0.9 in. (2.3 cm), 1.0 in. (2.5 cm), 1.1 in. (2.8 cm), 1.2 in. (3.0 cm), 1.3 in. (3.3 cm), 1.4 in. (3.6 cm), 1.5 in. (3.8 cm), 2.0 in. (5.1 cm), or any value therebetween. For example, the cutting element diameter 247 may be greater than 0.5 in. (1.3 cm). In another example, the cutting element diameter 247 may be less than 2.0 in. (5.1 cm). In yet other examples, the cutting element diameter 247 may be any value in a range between 0.5 in. (1.3 cm) and 2.0 in. (5.1 cm). In some embodiments, it may be critical that the cutting element diameter 247 is between 0.5 in. (1.3 cm) and 2.0 in. (5.1 cm) to allow the drilling fluid to flow through the substrate 225.

The bit 210 includes a bit diameter 249. In some embodiments, the bit diameter 249 may be in a range having an upper value, a lower value, or upper and lower values including any of 3 in. (7.6 cm), 4 in. (10.2 cm), 5 in. (12.7 cm), 6 in. (15.2 cm), 7 in. (17.8 cm), 8 in. (20.3 cm), 9 in. (22.9 cm), 10 in. (25.4 cm), 11 in. (27.9 cm), 12 in. (30.5 cm), 13 in. (33.0 cm), 14 in. (35.6 cm), 15 in. (38.1 cm), 16 in. (40.6 cm), 17 in. (43.2 cm), 18 in. (45.7 cm), 26 in. (66.0 cm), or any value therebetween. For example, the bit diameter 249 may be greater than 3 in. (7.6 cm). In another example, the bit diameter 249 may be less than 26 in. (66 cm). In yet other examples, the bit diameter 249 may be any value in a range between 3 in. (7.6 cm) and 26 in. (66 cm).

In some embodiments, the cleaning cutting element 222 and the bit 210 may have a cutting element to bit diameter ratio. In some embodiments, the cutting element to bit diameter ratio may be in a range having an upper value, a lower value, or upper and lower values including any of 1:3, 1:4, 1:5, 1:6, 1:8, 1:9, 1:10, 1:11, 1:12, 1:15, 1:20, or any value therebetween. For example, the cutting element to bit diameter ratio may be greater than 1:3. In another example, the cutting element to bit diameter ratio may be less than 1:20. In yet other examples, the cutting element to bit diameter ratio may be any value in a range between 1:3 and 1:20. In some embodiments, it may be critical that the cutting element to bit diameter ratio is between 1:5 and 1:12 to provide fluid flow to the center region of the bit.

In accordance with at least one embodiment of the present disclosure, the cleaning cutting element 222 may be located at the longitudinal axis 228 of the bit 210. For example, a longitudinal axis (e.g., the longitudinal axis 570 illustrated in FIG. 5) of the cleaning cutting element 222 may be coaxial with the longitudinal axis 228 of the bit. In some embodiments, the longitudinal axis of the cleaning cutting element 222 may be offset from the longitudinal axis 228 of the bit 210. In some embodiments, the longitudinal axis of the cutting element 222 may be parallel with the longitudinal axis 228 of the bit. In some embodiments, the cleaning cutting element 222 may not be parallel, or may be transverse to the longitudinal axis 228 of the bit.

FIG. 3-1 is a side view of a representation of a cleaning cutting element 322, according to at least one embodiment of the present disclosure. The cleaning cutting element 322 may include a substrate 325 and an ultrahard layer 323 joined to the substrate 325. The substrate 325 includes a plurality of fluid conduits 336 that exit the body of the substrate 325 at an exit opening 324.

The substrate 325 includes a bottom surface 346 and an upper surface 348 opposite the bottom surface 346. A circumferential wall 350 may extend between the upper surface 348 and the bottom surface 346. In the embodiment shown, the substrate 325 may have a cylindrical shape, with the bottom surface 346 having a circular shape, the upper surface 348 having a circular shape, and the circumferential wall 350 forming the cylindrical body between the bottom surface 346 and the upper surface 348. But it should be understood that the substrate 325 may have other shapes, such as prismatic volumes having any cross-sectional shape, including ovoid, circular, triangular, square, rectangular, pentagonal, hexagonal, heptagonal, octagonal, nonagonal, decagonal, any other polygonal shape, and combinations thereof.

As discussed herein, the substrate 325 includes a substrate bore extending at least partially therethrough. The substrate bore has a bore inlet in the bottom surface 346. The substrate bore may extend through the body of the substrate 325 to a junction between the bottom surface 346 and the upper surface 348. At the junction, multiple fluid conduits 336 may extend toward the circumferential wall 350. The fluid conduits 336 may exit the substrate 325 at exit openings 324 in the circumferential wall 350. In this manner, the drilling fluid may be directed out of the cleaning cutting element 322.

In some embodiments, the exit openings 324 may be evenly circumferentially distributed about the circumferential wall 350 such that a spacing between adjacent exit openings 324 is the same. In some embodiments, the exit opening 324 may be unevenly circumferentially distributed about the circumferential wall 350 such that a spacing between adjacent exit openings 324 is different. The circumferential spacing of the exit openings 324 may be based on the targets for the drilling fluid directed out of the substrate 325 through the exit openings 324.

In some embodiments, the exit opening 324 may be evenly longitudinally distributed along the circumferential wall 350 such that a spacing between the exit openings 324 and the upper surface 348 (and the bottom surface 346) may be the same. In some embodiments, the exit opening 324 may be unevenly longitudinally distributed along the circumferential wall 350 such that a spacing between the exit openings 324 and the upper surface 348 (and the bottom surface 346) may be different. The longitudinal spacing of the exit openings 324 may be based on the targets (e.g., junk slot, cutting elements, blade root) for the drilling fluid directed out of the substrate 325 through the exit openings 324.

FIG. 3-2 is a longitudinal cross-sectional view of the cleaning cutting element 322 of FIG. 3-1. The substrate 325 includes a substrate bore 334 passing therethrough. As discussed herein, drilling fluid may pass into the substrate bore 334 from a fluid passage in the body of the bit. The substrate bore 334 has an inlet 352 in the bottom surface 346. Drilling fluid may enter the substrate 325 at the inlet 352 in the bottom surface 346 and pass into the substrate bore 334. The drilling fluid may be diverted to the fluid conduits 336 at a junction 342 located at or proximate the upper surface 348 of the substrate 325. The drilling fluid may pass out of the substrate 325 through the exit openings 324 of the fluid conduits 336.

In the embodiment shown, the inlet 352 in the bottom surface 346 has an inlet diameter 354 and a bore diameter 356 in the body of the substrate 325. The inlet 352 may be flared such that the inlet diameter 354 is greater than the bore diameter 356 to help improve the hydraulic flow through the substrate bore 334 and/or increase the pressure of the drilling fluid through the substrate bore 334. In some embodiments, the inlet diameter 354 of the inlet 352 may be greater than an exit diameter 358 of the exit openings 324. This may help to increase the pressure of the drilling fluid as the drilling fluid exits the substrate 325 through the exit openings 324.

In some embodiments, the inlet diameter 354 may be in a range having an upper value, a lower value, or upper and lower values including any of 0.3 in. (0.8 cm), 0.4 in. (1.0 cm), 0.5 in. (1.3 cm), 0.6 in. (1.5 cm), 0.7 in. (1.8 cm), 0.8 in. (2.0 cm), 0.9 in. (2.3 cm), 1.0 in. (2.5 cm), 1.1 in. (2.8 cm), 1.2 in. (3.0 cm), 1.3 in. (3.3 cm), or any value therebetween. For example, the inlet diameter 354 may be greater than 0.3 in. (0.8 cm). In another example, the inlet diameter 354 may be less than 1.3 in. (3.3 cm). In yet other examples, the inlet diameter 354 may be any value in a range between 0.3 in. (0.8 cm) and 1.3 in. (3.3 cm). In some embodiments, it may be critical that the inlet diameter 354 is between 0.5 in. (1.3 cm) and 1.1 in. (2.8 cm) to maintain sufficient flow of the drilling fluid through the substrate bore 334.

In some embodiments, the exit diameter 358 may be in a range having an upper value, a lower value, or upper and lower values including any of 0.1 in. (0.3 cm), 0.2 in. (0.5 cm), 0.3 in. (0.8 cm), 0.4 in. (1.0 cm), 0.5 in. (1.3 cm), 0.6 in. (1.5 cm), 0.7 in. (1.8 cm), 0.8 in. (2.0 cm), 0.9 in. (2.3 cm), 1.0 in. (2.5 cm), or any value therebetween. For example, the exit diameter 358 may be greater than 0.1 in. (0.3 cm). In another example, the exit diameter 358 may be less than 1.0 in. (2.5 cm). In yet other examples, the exit diameter 358 may be any value in a range between 0.1 in. (0.3 cm) and 1.0 in. (2.5 cm). In some embodiments, it may be critical that the exit diameter 358 is between 0.3 in. (0.8 cm) and 0.8 in. (2.0 cm) to maintain a flow rate and pressure of the flow out of the fluid conduits 336.

The inlet diameter 354 and the exit diameter 358 may have an inlet to exit ratio. In some embodiments, the inlet to exit ratio may be in a range having an upper value, a lower value, or upper and lower values including any of 1:1, 5:4, 4:3, 3:2, 2:1, 3:1, 4:1, 5:1, or any value therebetween. For example, the inlet to exit ratio may be greater than 1:1. In another example, the inlet to exit ratio may be less than 5:1. In yet other examples, the inlet to exit ratio may be any value in a range between 1:1 and 5:1. In some embodiments, it may be critical that the inlet to exit ratio is between 4:3 and 2:1 to maintain a desired pressure of the drilling fluid at the exit openings 324. In some embodiments, each of the exit openings 324 may have the same inlet to exit ratio. In some embodiments, different exit openings may have different inlet to exit ratios.

As discussed herein, the ultrahard layer 323 may be joined to the substrate 325 at the upper surface 348 of the substrate 325. In some embodiments, the ultrahard layer 323 may be directly formed on the substrate 325. For example, when the ultrahard layer 323 is formed using high-pressure high-temperature (HPHT) techniques, the ultrahard layer 323 may be formed on the substrate 325.

In some embodiments, the ultrahard layer 323 may be joined to an upper portion 360 of the substrate 325. A lower portion 362 of the substrate may be formed after forming the ultrahard layer 323 on the upper portion 360 of the substrate 325. For example, the lower portion 362 may be additively manufactured on the upper portion 360 base. Additively manufacturing may include forming the substrate 325 layer-by-layer on top of the upper portion 360. In accordance with at least one embodiment of the present disclosure, additively manufacturing at least a portion of the substrate may allow for the formation of the substrate bore 334 and the fluid conduits 336 in the substrate 325. This may help to reduce the manufacturing time, including time for milling, grinding, and otherwise processing the substrate 325. In some embodiments, additively manufacturing at least a portion of the substrate 325 may allow the substrate 325 to include complex geometries of the substrate bore 334 and/or the fluid conduits 336 that may not be millable and/or grindable. For example, additively manufacturing the substrate 325 may allow the substrate bore 334 and/or the fluid conduits 336 to include curved portions to direct the fluid conduits 336 and exit openings 324 to a particular feature of the bit.

In some embodiments, the substrate 325 may be formed in a single massive block, such as through casting, infiltration, sintering, and so forth. The substrate bore 334 and/or the fluid conduits 336 may be formed in the substrate 325 after the substrate 325 is formed. For example, the substrate bore 334 and/or the fluid conduits 336 may be drilled, milled, and/or ground into the body of the substrate 325. This may help to simplify the manufacturing of the cleaning cutting element 322 and/or the substrate 325.

FIG. 4 is a cross-sectional view of a representation of a cleaning cutting element 422, according to at least one embodiment of the present disclosure. The cleaning cutting element 422 may include a substrate 425 and an ultrahard layer 423 joined to the substrate 425. The substrate 425 includes a substrate bore 434 passing at least partially therethrough. As discussed herein, drilling fluid may pass into the substrate bore 434 through an inlet 452 in fluid communication with a fluid passage in the body of the bit. The drilling fluid may be diverted to the fluid conduits 436 at a junction 442 located at or proximate the upper surface 448 of the substrate 425. The drilling fluid may pass out of the substrate 425 through the exit openings 424 of the fluid conduits 436 exiting out of a circumferential wall 450 that extends between the bottom surface 446 and the upper surface 448.

In accordance with at least one embodiment of the present disclosure, the cleaning cutting element 422 may include a deflector 464. The deflector 464 may be located at the junction 442 between the substrate bore 434 and the fluid conduits 436. The deflector 464 may be located to receive the impact of the drilling fluid at the junction 442. Drilling fluid may impact the deflector 464 before being diverted to the fluid conduits 436. The deflector 464 may reduce the drilling fluid directly interfacing with the matrix material of the substrate 425 at the junction 442. This may help to reduce or prevent damage to the substrate 425 caused by the drilling fluid engaging the matrix material of the substrate 425 at the junction 442. This may help to extend the operation lifetime of the cleaning cutting element 422.

In some embodiments, the deflector 464 may be formed from an erosion- and/or wear-resistant material. For example, the deflector 464 may be formed from PCD, a PDC, or a thermally stable polycrystalline diamond (TSP). Forming the deflector 464 from an erosion- and/or wear-resistant material may help to reduce the wear on the deflector 464 and/or other portions of the cleaning cutting element 422 caused by drilling fluid.

In the embodiment shown, the deflector 464 has a conical shape. A conical shape may help to divert the flow of the drilling fluid into the fluid conduits 436. The deflector 464 may have any shape. For example, the deflector 464 may have a domed shape, a pyramidal shape, a frustoconical shape, any other shape, and combinations thereof.

In some embodiments, the deflector 464 may be formed with the substrate 425 when the ultrahard layer 423 is formed on the substrate 425. In some embodiments, the deflector 464 may be separately formed from the substrate 425 and subsequently secured to the substrate 425 in the upper surface of the junction 442. The deflector 464 may be press fit, brazed, sintered, or mechanically fixed to the upper surface of the junction 442.

Figure 5:
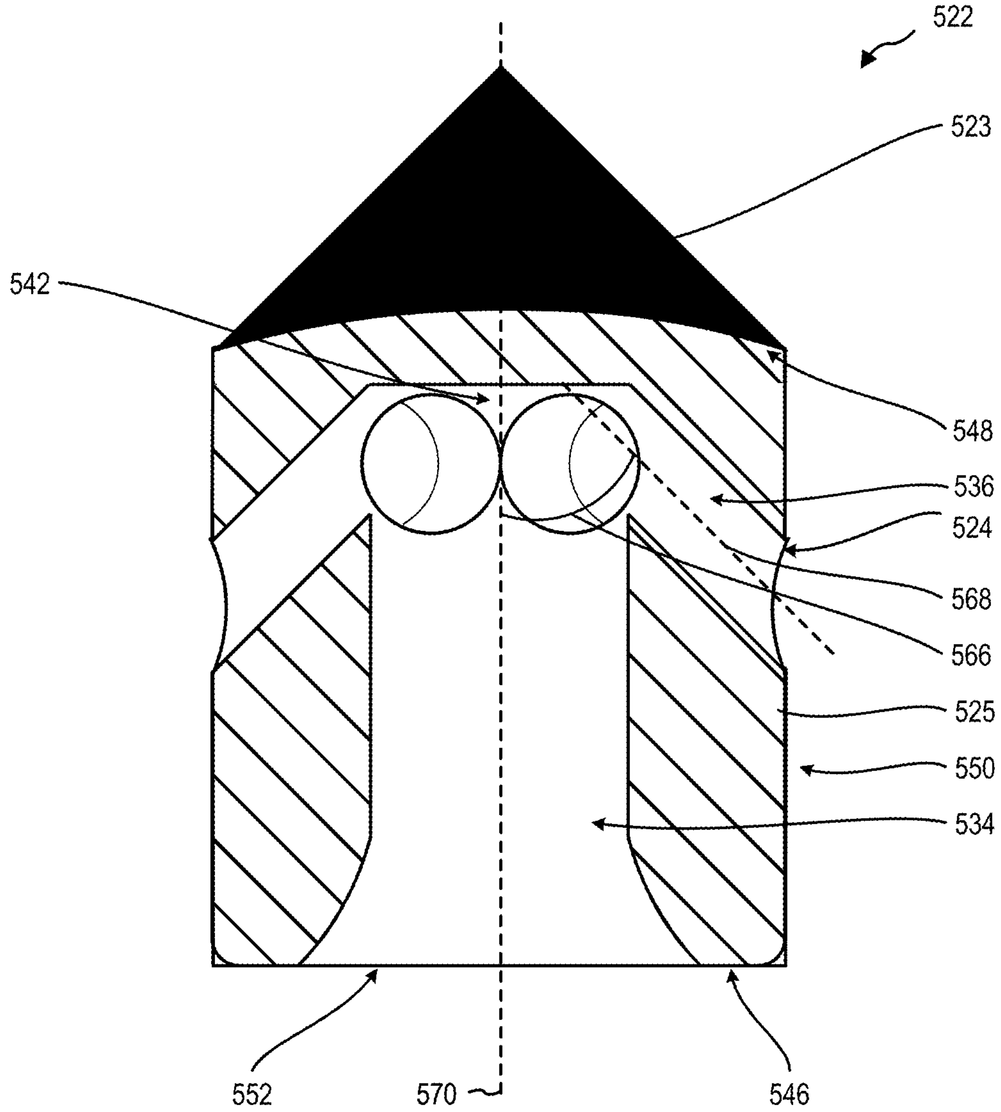
FIG. 5 is a cross-sectional view of a representation of a cleaning cutting element, according to at least one embodiment of the present disclosure.

FIG. 5 is a cross-sectional view of a representation of a cleaning cutting element 522, according to at least one embodiment of the present disclosure. The cleaning cutting element 522 may include a substrate 525 and an ultrahard layer 523 joined to the substrate 525. The substrate 525 includes a substrate bore 534 passing at least partially therethrough. As discussed herein, drilling fluid may pass into the substrate bore 534 through an inlet 552 in fluid communication with a fluid passage in the body of the bit. The drilling fluid may be diverted to the fluid conduits 536 at a junction 542 located at or proximate the upper surface 548 of the substrate 525. The drilling fluid may pass out of the substrate 525 through the exit openings 524 of the fluid conduits 536 exiting out of a circumferential wall 550 that extends between the bottom surface 546 and the upper surface 548.

In the embodiment shown, the fluid conduits 536 may be oriented with a longitudinal conduit angle 566 formed between a conduit axis 568 of the fluid conduit 536 and a longitudinal axis 570 of the cleaning cutting element 522. The longitudinal conduit angle 566 may be any angle. In some embodiments, the longitudinal conduit angle 566 may be in a range having an upper value, a lower value, or upper and lower values including any of 150°, 120°, 110°, 100°, 90°, 85°, 80°, 75°, 70°, 65°, 60°, 55°, 50°, 45°, or any value therebetween. For example, the longitudinal conduit angle 566 may be greater than 45°. In another example, the longitudinal conduit angle 566 may be less than 90°. In yet other examples, the longitudinal conduit angle 566 may be any value in a range between 45° and 90°. In some embodiments, it may be critical that the longitudinal conduit angle 566 is between 90° and 150° to direct the drilling fluid to a particular feature of the bit. The longitudinal conduit angle 566 of each fluid conduit 536 may be based on the respective target (e.g., junk slot, cutting elements, blade root) for the fluid conduit 536. In some embodiments, each of the fluid conduits 536 may have the same longitudinal conduit angle 566. In some embodiments, different fluid conduits 536 may have different conduit angles 566.

Figure 6:
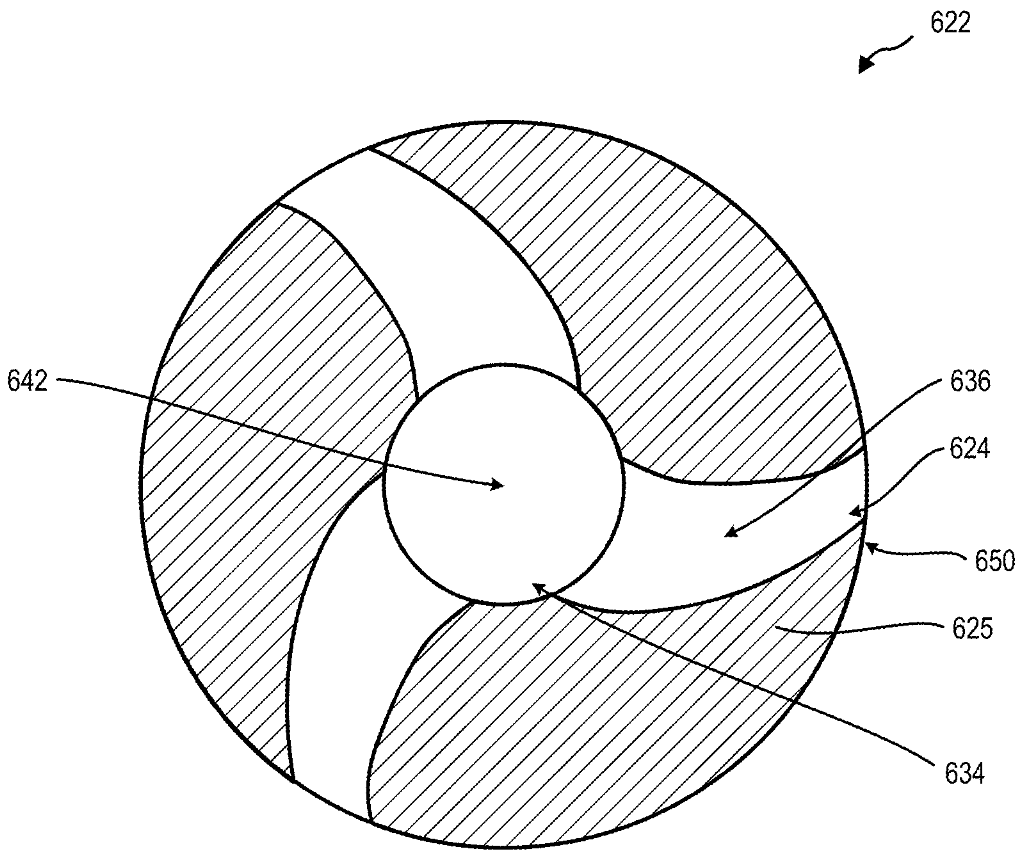
FIG. 6 is a cross-sectional view of a representation of a cleaning cutting element, according to at least one embodiment of the present disclosure.

FIG. 6 is a cross-sectional view of a representation of a cleaning cutting element 622, according to at least one embodiment of the present disclosure. The cleaning cutting element 622 may include a substrate 625 and an ultrahard layer joined to the substrate 625. The substrate 625 includes a substrate bore 634 passing at least partially therethrough. As discussed herein, drilling fluid may pass into the substrate bore 634 through an inlet in fluid communication with a fluid passage in the body of the bit. The drilling fluid may be diverted to the fluid conduits 636 at a junction 642 between the substrate bore 634 and the fluid conduits 636. The drilling fluid may pass out of the substrate 625 through the exit openings 624 of the fluid conduits 636 exiting out of a circumferential wall 650 of the substrate 625.

In accordance with at least one embodiment of the present disclosure, the cleaning cutting element 622 may include one or more fluid conduits 636 that are not straight. For example, as may be seen in FIG. 6, the cleaning cutting element 622 may include a fluid conduit 636 that is curved between the substrate bore 634 and the circumferential wall 650. Put another way, the fluid conduit 636 may have a curved profile. A curved fluid conduit 636 may help to orient the drilling fluid that exits the exit openings 624 to be directed to a particular feature of the bit. In some embodiments, additive manufacturing may facilitate forming curved fluid conduits 636 in the substrate 625 through layer-by-layer formation of the substrate 625. In accordance with at least one embodiment of the present disclosure, additively manufacturing at least a portion of the substrate may allow for the formation of the substrate bore 634 and the fluid conduits 636 in the substrate 625. This may help to reduce the manufacturing time, including time for milling, grinding, and otherwise processing the substrate 625.

Figure 7:
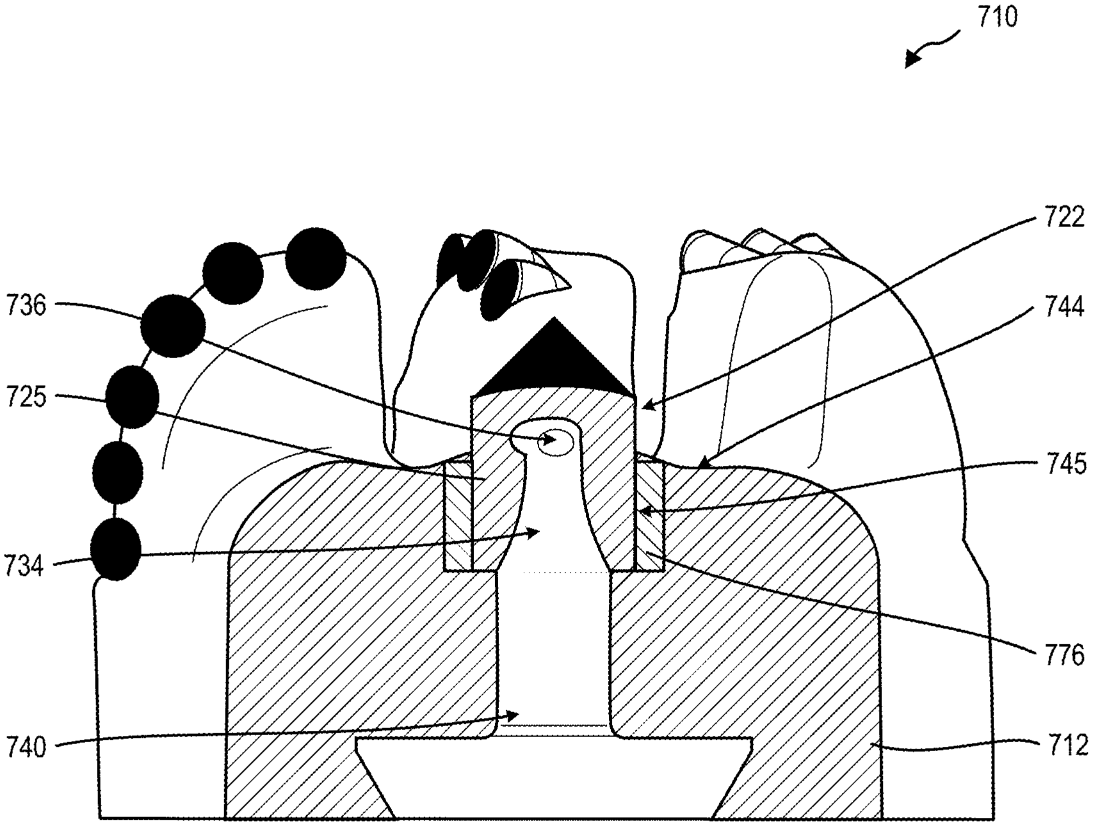
FIG. 7 is a longitudinal cross-sectional view of a bit having a cleaning cutting element secured to a body thereof, according to at least one embodiment of the present disclosure.

FIG. 7 is a longitudinal cross-sectional view of a bit 710 having a cleaning cutting element 722 secured to a body 712 thereof, according to at least one embodiment of the present disclosure. The cleaning cutting element 722 may include a substrate bore 734 formed in a substrate 725 and extending at least partially therethrough. The substrate bore 734 may be in fluid communication with a fluid passage 740 through the body 712. The substrate bore 734 may direct the drilling fluid to one or more fluid conduits 736. The fluid conduits 736 may direct the drilling fluid to one or more features of the bit 710.

The body 712 may include a cutting element pocket 745 formed in a downhole surface 744 of the body 712. In accordance with at least one embodiment of the present disclosure, the cleaning cutting element 722 may be secured to the body 712 with a sleeve 776. For example, the cleaning cutting element 722 may be brazed to the sleeve 776. The sleeve 776 may be secured to the body 712 at the cutting element pocket 745. For example, the sleeve 776 may be secured to the body 712 with a weld, an interference fit, a press fit, a mechanical fastener, any other connection mechanism, and combinations thereof. In some embodiments, the sleeve 776 may be made of the same material as the substrate of the cleaning element. In some embodiments, the sleeve 776 may be formed from any other material, such as hardened tool steel. In some embodiments, the sleeve 776 may be formed from a sacrificial part to be replaced when bit 710 is going through repair.

In some embodiments, the body 712 of the bit 710 and the material of the substrate 725 may have different coefficients of thermal expansion. This may cause the body 712, and the cutting element pocket 745 in the body 712, to expand at a different rate than the substrate 725. When the body 712 and the substrate 725 cool down, the cutting element pocket 745 may change shape at a greater or lesser rate than the substrate 725, thereby prohibiting the connection between the substrate 725 and the body 712. For example, if the body 712 has a larger coefficient of thermal expansion than the substrate 725, the cutting element pocket 745 may shrink and damage the substrate 725 during the brazing and/or cooling process. In some examples, if the body 712 has a smaller coefficient of thermal expansion than the substrate 725, then the connection between the substrate 725 and the cutting element pocket 745 may be loose after the substrate 725 and the body 712 cool down.

To improve the connection between the substrate 725 and the body 712, the substrate 725 may be secured to the sleeve 776. The sleeve 776 may be independently secured to the cutting element pocket 745 of the body 712. This may help to reduce the mismatch of the coefficients of thermal expansion, thereby improving the connection between the substrate 725 and the body 712.

Figures 1, 8:
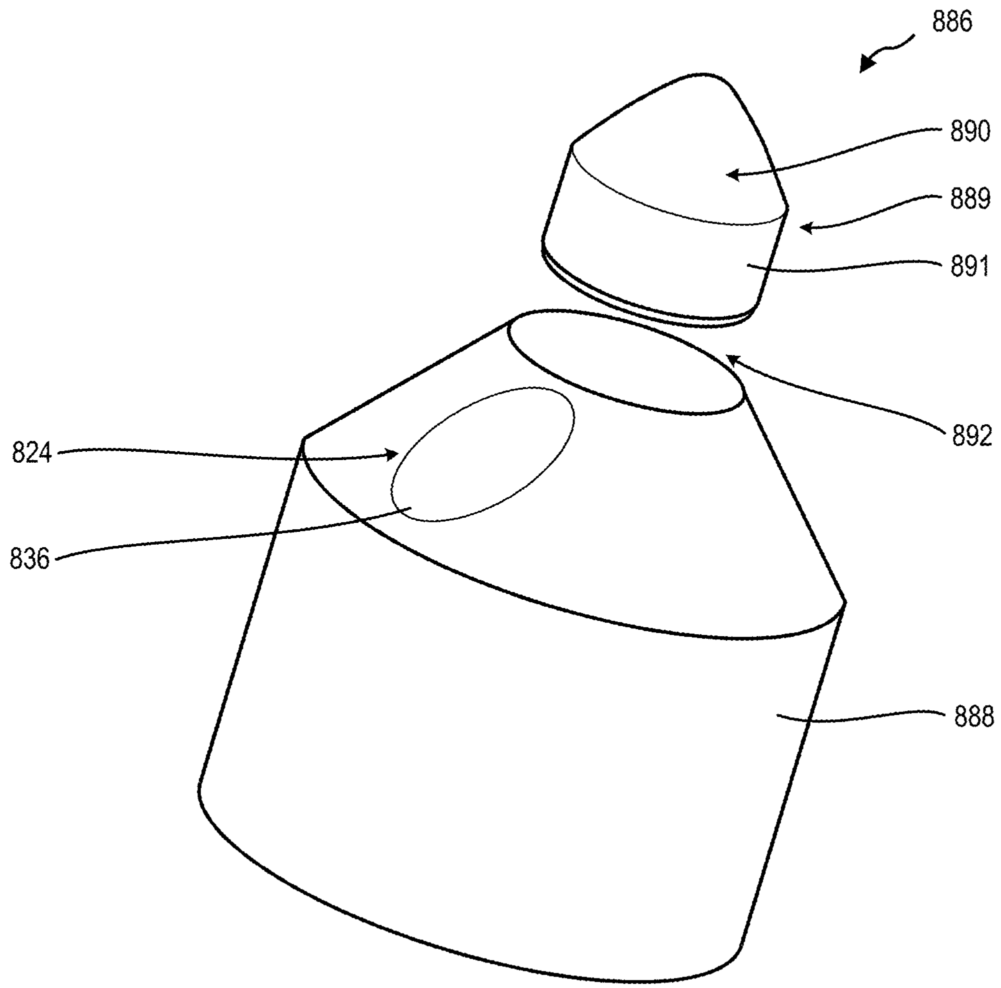
Figures 2, 8:
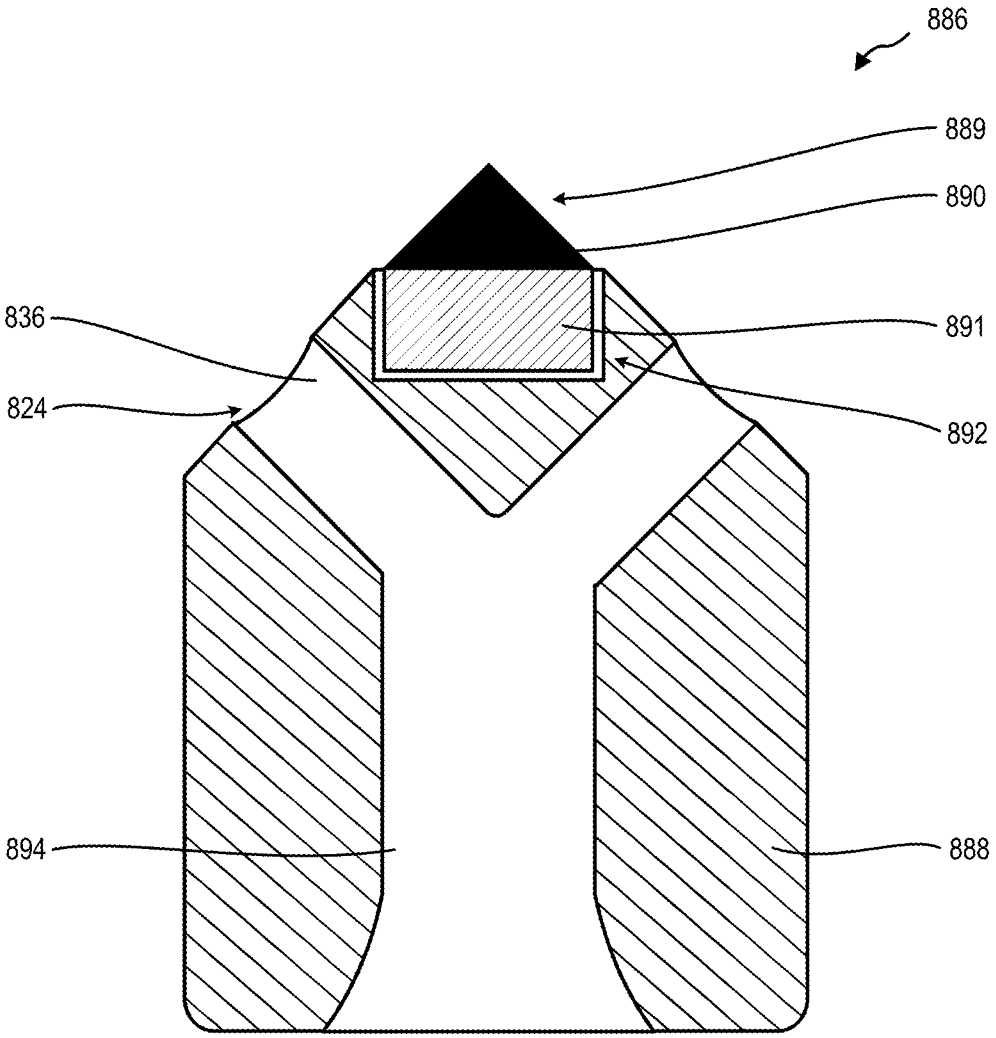

FIG. 8-1 is a perspective exploded view of a cleaning cutting system 886, according to at least one embodiment of the present disclosure. The cleaning cutting system 886 includes a cleaning base 888 and a cutting element 889. The cutting element 889 may include an ultrahard layer 890 bonded to a substrate 891. In some embodiments, the cutting element 889 may be purely made of ultrahard material, such as PCD, or thermally stable polycrystalline diamond (TSP). The cleaning base 888 may include a cutting element pocket 892. The cutting element 889 may be secured to the cleaning base 888 in the pocket 892, such as by braze, weld, or other securing mechanism. The cleaning base 888 may further include one or more fluid conduits 836 that exit the cleaning base 888 at an exit opening 824.

In accordance with at least one embodiment of the present disclosure, the cleaning base 888 may be secured to a cutting element pocket (e.g., cutting element pocket 245 of FIG. 2-4) in a central region of a bit (e.g., bit 210). The cutting element 889 may be secured to the cleaning base 888 at the cutting element pocket 892. Utilizing a separate cutting element 889 and cleaning base 888 may help to improve the flexibility and/or the versatility of the bit. For example, the cleaning base 888 may be formed separately from the cutting element 889. This may allow the cleaning base 888 to include different and/or more complex internal geometries of the one or more fluid conduits 836 than may be possible in the substrate of the cutting element 889. In some embodiments, utilizing a separate cutting element 889 and cleaning base 888 may allow the drill manufacturer to utilize a cutting element 889 that is located in inventory or is otherwise readily available.

FIG. 8-2 is a cross-sectional view of the cleaning cutting system 886 of FIG. 8-1 in an assembled configuration. In the embodiment shown, the cutting element 889 is secured to the cleaning base 888 at the cutting element pocket 892. For example, the cutting element 889 may be brazed, welded, or otherwise connected to the cleaning base 888 at the cutting element pocket 892. In the embodiment shown, the cleaning base 888 includes a base bore 894 that is in fluid communication with the fluid passage of a bit. Drilling fluid from the fluid passage of the bit may enter the base bore 894, be diverted to the one or more fluid conduits 836 and out of the cleaning base 888 through the exit opening 824. As discussed herein, the cleaning base 888 may increase the flexibility of the bit, including the flexibility of the placement and/or orientation of the one or more fluid conduits 836 and/or exit opening 824 in the cleaning base 888.

Figure 9:
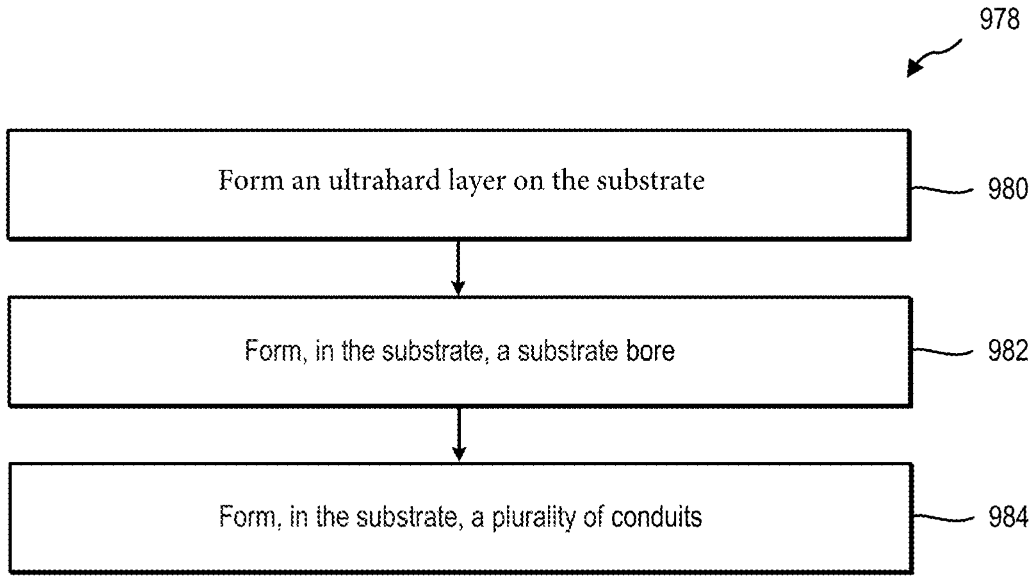
FIG. 9 is a flowchart of a method for forming a cutting element, according to at least one embodiment of the present disclosure.

FIG. 9 is a representation of a method 978 for forming a cutting element, according to at least one embodiment of the present disclosure. The method may include forming an ultrahard layer on a substrate at 980. As discussed herein, forming the ultrahard layer on the substrate may include forming an ultrahard material layer directly on a matrix material forming the substrate, such as by a high-temperature, high-pressure (HTHP) process.

The operator may form, in the substrate, a substrate bore at 982. The substrate bore may extend from an inlet at a bottom surface of the substrate to a junction proximate the ultrahard layer. The operator may form, in the substrate, a plurality of conduits at 984. The conduits may extend from the junction to a circumferential wall of the body of the substrate. In some embodiments, it is critical that the substrate bore and the plurality of conduits are formed after the ultrahard layer is formed on the substrate at 980.

In some embodiments, forming the substrate bore and forming the conduits includes additively manufacturing the substrate layer-by-layer around the substrate bore and the conduits. In some embodiments, the operator may secure a deflector at the junction between the substrate bore and the conduits.

The embodiments of the cleaning cutting elements have been primarily described with reference to wellbore drilling operations; the cleaning cutting elements described herein may be used in applications other than the drilling of a wellbore. In other embodiments, cleaning cutting elements, according to the present disclosure, may be used outside a wellbore or other downhole environment used for the exploration or production of natural resources. For instance, cleaning cutting elements of the present disclosure may be used in a borehole used for placement of utility lines. Accordingly, the terms “wellbore,” “borehole” and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers’ specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to “one embodiment” or “an embodiment” of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are “about” or “approximately” the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional “means-plus-function” clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words ‘means for’ appear together with an associated function. Each addition, deletion, and modification to the embodiments that falls within the meaning and scope of the claims is to be embraced by the claims.

The terms “approximately,” “about,” and “substantially” as used herein represent an amount close to the stated amount that is within standard manufacturing or process tolerances, or which still performs a desired function or achieves a desired result. For example, the terms “approximately,” “about,” and “substantially” may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to “up” and “down” or “above” or “below” are merely descriptive of the relative position or movement of the related elements.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A bit, comprising:
- a body having a longitudinal axis, a fluid passage extending through the body;
- a plurality of blades extending from the body, the plurality of blades forming a plurality of junk slots between adjacent blades of the plurality of blades; and
- a cleaning cutting element located at a center region of the bit including:
  - a substrate including a substrate bore extending at least partially therethrough, the substrate bore in fluid communication with the fluid passage of the body;
  - a plurality of conduits in fluid communication with the substrate bore, each conduit of the plurality of conduits including an exit opening directing drilling fluid out of the body of the bit; and
  - an ultrahard layer having a conical shape and joined to an upper surface of the substrate,
- wherein a longitudinal axis of the cleaning cutting element is coaxial with a longitudinal axis of the body.

2. The bit of claim 1, further comprising a deflector located at a junction between the substrate bore and the plurality of conduits.

3. The bit of claim 2, wherein the deflector is formed from a superhard material.

4. The bit of claim 1, wherein the exit opening of at least one conduit of the plurality of conduits is oriented to direct fluid to a junk slot of the plurality of junk slots.

5. The bit of claim 1, wherein the plurality of conduits is oriented transverse to the substrate bore.

6. The bit of claim 1, wherein a conduit quantity of the plurality of conduits is the same as a blade quantity of the plurality of blades.

7. The bit of claim 1, wherein a ratio of a cutting element diameter of the cleaning cutting element to a bit diameter of the bit is between 1:6 and 1:12.

8. A bit, comprising:
- a body having a longitudinal axis, a fluid passage extending through the body;
- a plurality of blades extending from the body, the plurality of blades forming a plurality of junk slots between adjacent blades of the plurality of blades; and
- a cleaning cutting element located at a center region of the bit including:
  - a substrate including a substrate bore extending at least partially therethrough, the substrate bore in fluid communication with the fluid passage of the body;
  - a plurality of conduits in fluid communication with the substrate bore, each conduit of the plurality of conduits including an exit opening directing drilling fluid out of the body of the bit; and
  - an ultrahard layer joined to an upper surface of the substrate,
- wherein a conduit quantity of the plurality of conduits is the same as a blade quantity of the plurality of blades.

9. The bit of claim 8, further comprising a deflector located at a junction between the substrate bore and the plurality of conduits.

10. The bit of claim 9, wherein the deflector is formed from a superhard material.

11. The bit of claim 8, wherein the exit opening of at least one conduit of the plurality of conduits is oriented to direct fluid to a junk slot of the plurality of junk slots.

12. The bit of claim 8, wherein the substrate bore is oriented approximately parallel to the longitudinal axis of the body.

13. The bit of claim 8, wherein the plurality of conduits is oriented transverse to the substrate bore.

14. The bit of claim 8, wherein a ratio of a cutting element diameter of the cleaning cutting element to a bit diameter of the bit is between 1:6 and 1:12.

15. A bit, comprising:
- a body having a longitudinal axis, a fluid passage extending through the body;
- a plurality of blades extending from the body, the plurality of blades forming a plurality of junk slots between adjacent blades of the plurality of blades; and
- a cleaning cutting element located at a center region of the bit including:
  - a substrate including a substrate bore extending at least partially therethrough, the substrate bore in fluid communication with the fluid passage of the body;
  - a plurality of conduits in fluid communication with the substrate bore, each conduit of the plurality of conduits including an exit opening directing drilling fluid out of the body of the bit; and
  - an ultrahard layer joined to an upper surface of the substrate,
- wherein a ratio of a cutting element diameter of the cleaning cutting element to a bit diameter of the bit is between 1:6 and 1:12.

16. The bit of claim 15, further comprising a deflector located at a junction between the substrate bore and the plurality of conduits.

17. The bit of claim 16, wherein the deflector is formed from a superhard material.

18. The bit of claim 15, wherein the exit opening of at least one conduit of the plurality of conduits is oriented to direct fluid to a junk slot of the plurality of junk slots.

19. The bit of claim 15, wherein the substrate bore is oriented approximately parallel to the longitudinal axis of the body.

20. The bit of claim 15, wherein the plurality of conduits is oriented transverse to the substrate bore.

* * * * *